July 6, 1954 C. M. WALBY 2,682,715
EXCAVATOR FOR HEAVY OBJECTS
Filed Sept. 29, 1948 5 Sheets-Sheet 2
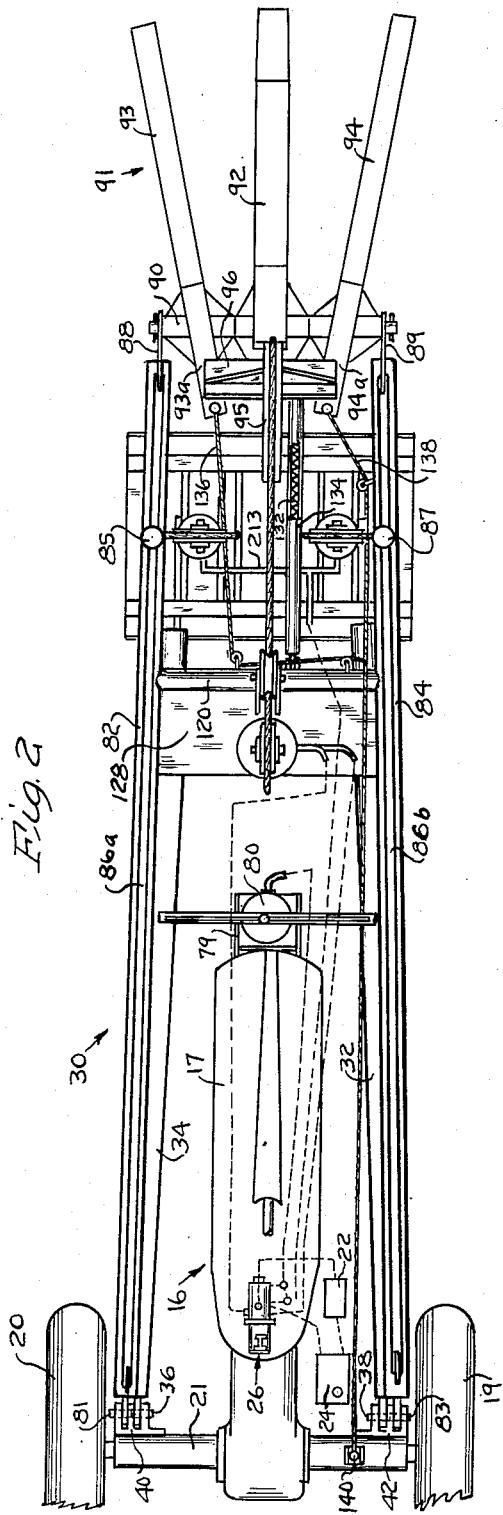
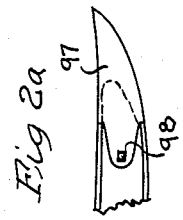
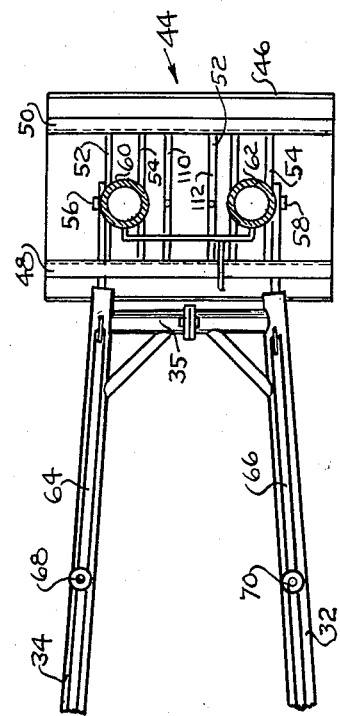
INVENTOR.
CASPER M. WALBY
BY
Attorney

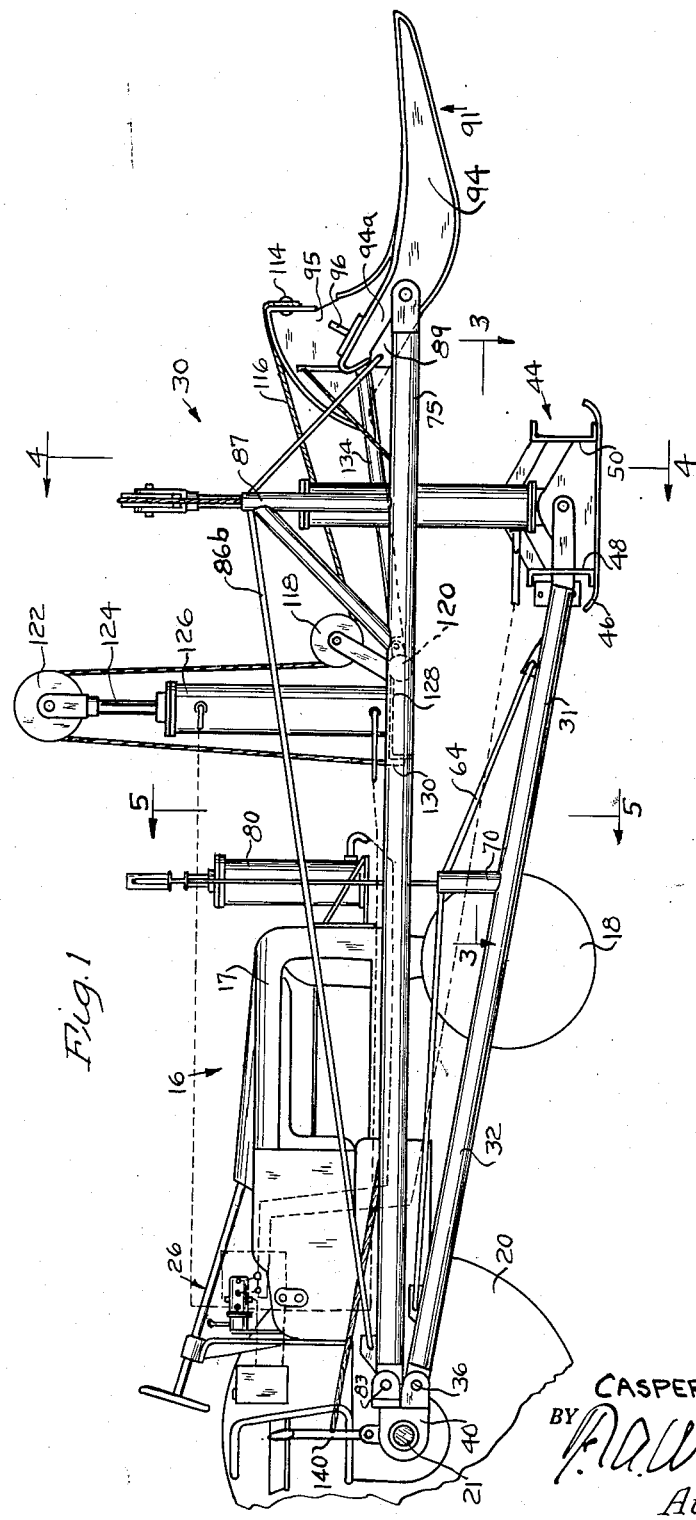

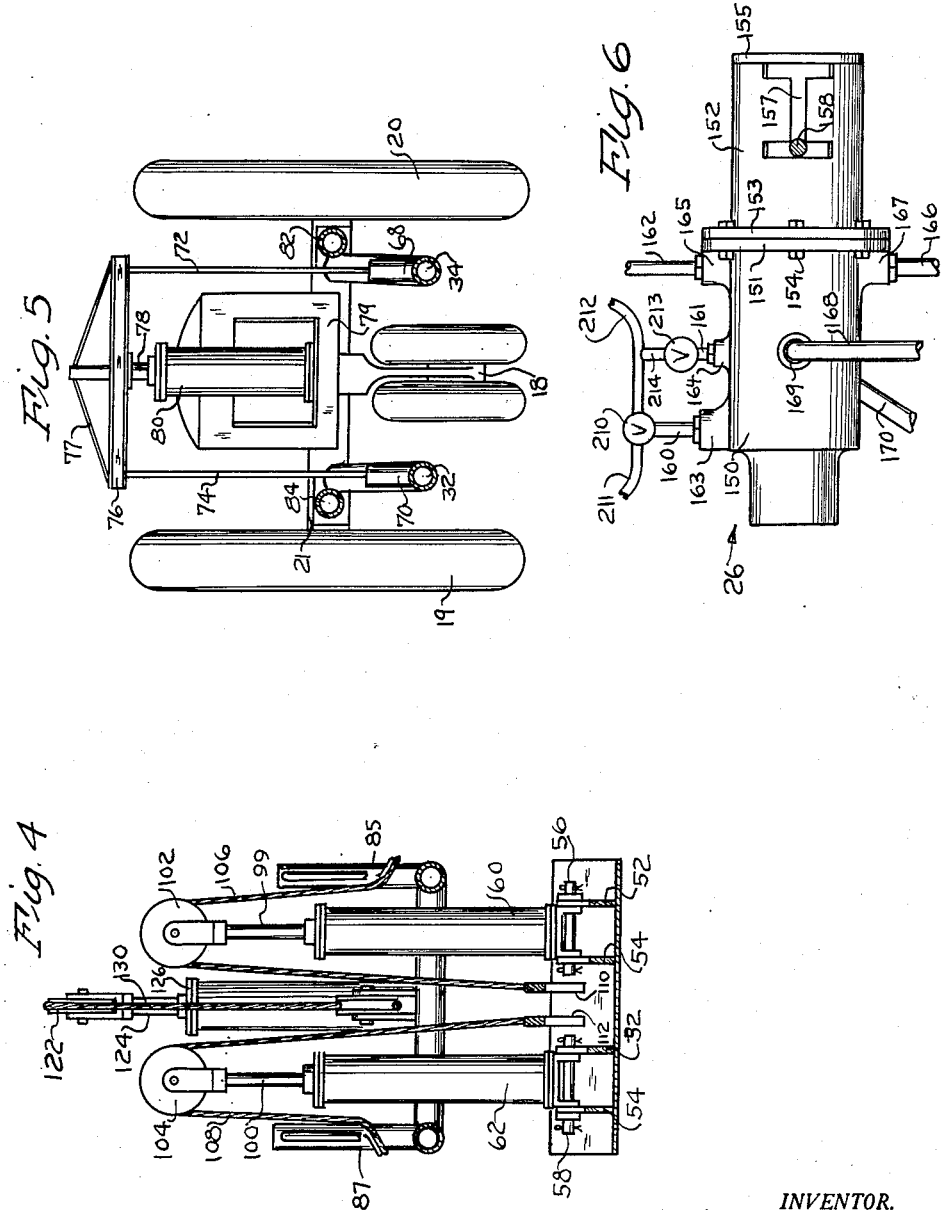

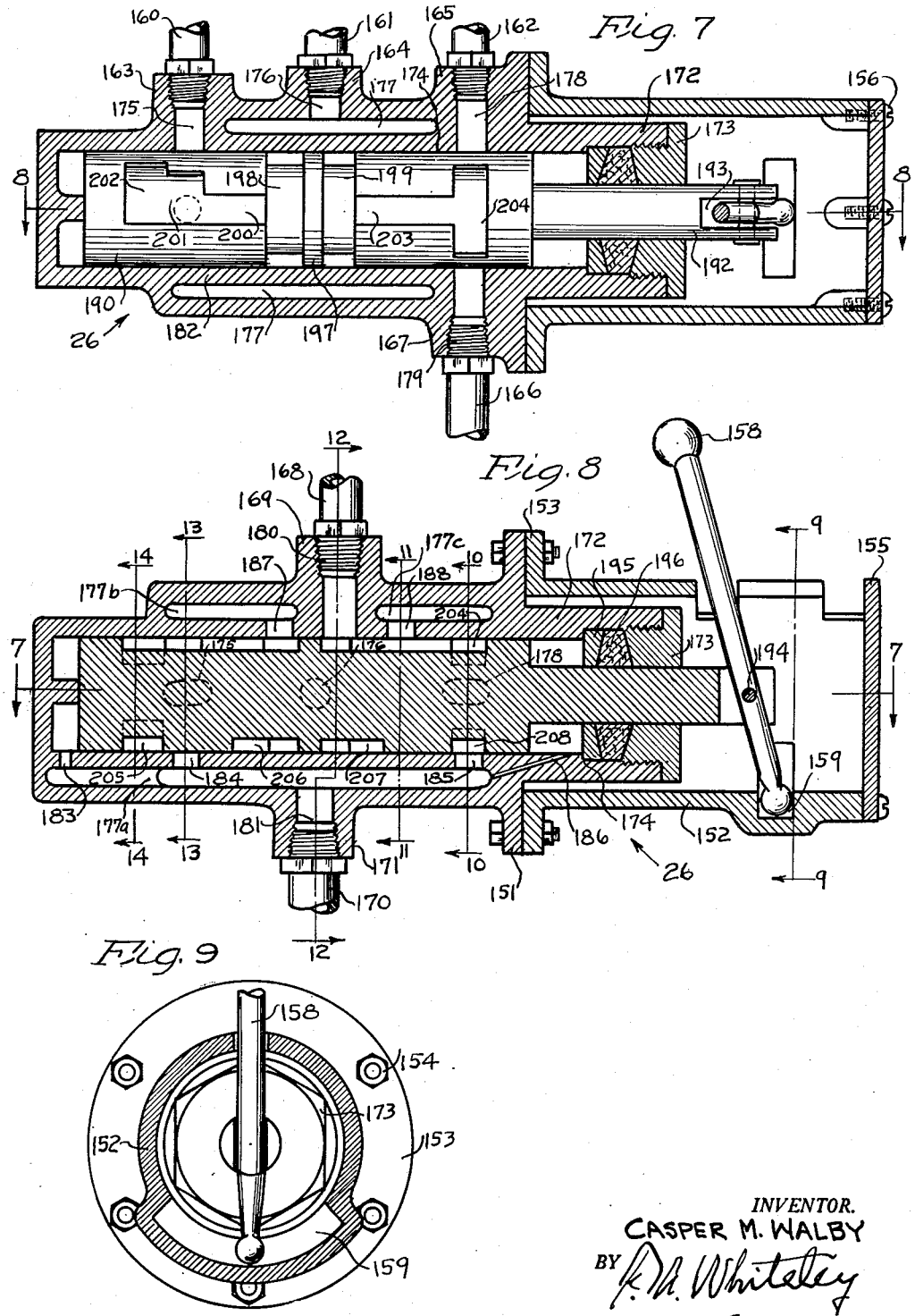

July 6, 1954   C. M. WALBY   2,682,715
EXCAVATOR FOR HEAVY OBJECTS
Filed Sept. 29, 1948   5 Sheets-Sheet 5

INVENTOR.
CASPER M. WALBY
BY
Attorney

Patented July 6, 1954

2,682,715

UNITED STATES PATENT OFFICE 2,682,715

EXCAVATOR FOR HEAVY OBJECTS

Casper M. Walby, Clear Lake, Wis.

Application September 29, 1948, Serial No. 51,700

5 Claims. (Cl. 37—2)

My invention relates to improvements in an excavator for use in removing heavy objects such as stones or tree stumps which are lodged in the soil. In particular, it relates to a device which is used in combination with a conventional tractor for excavating tree stumps or relatively large stones such as may be existing as a result of natural causes such as glacial deposit.

In certain land areas the soil is rendered non-arable because of the existence of a large number of tree stumps remaining from forested land, or because of the presence of large stones resulting from glacial deposits or outcropping. Regardless of their origin, such objects are heavy and are often so difficult to move that in many instances it has been impractical to properly clear the land because of the expense and labor involved. Thus large areas of otherwise valuable land have been relegated to grazing purposes or are rendered totally useless.

In the present invention I have provided a device which may be used in combination with a conventional farm tractor which is capable of digging the tree stump or stone out of the ground if it is embedded therein near the surface, and also elevating it so that it may be dropped into a truck or wagon to be carted away. Because such objects as my device is capable of handling may be quite heavy and may actually weigh as much as a ton, the device is quite rugged and should be distinguished from a conventional tractor hoist used for general farm purposes.

The principal object of the invention is to provide an excavating device which is adapted for connection to a tractor for excavating and hoisting heavy objects from or near the surface of the ground.

Another object is to provide an excavating and elevating device which include a pair of frames adapted for connection to an axle frame of a tractor with excavating means carried on one of the frames, ground engaging means on the other frame, and a hoist connected between the frames for elevating the object when excavated.

Another object is to provide in a device for dislodging and excavating heavy objects from the ground such as stones or tree stumps, a frame structure supported on the front end of a tractor including a power operated tine for dislodging the object, other tines which may be operated either independently or in conjunction with the power operated tine to assit in picking up the dislodged object, and power operated means for elevating the several tines to actually excavate and remove the object.

A further object is to provide an excavating device for use with a tractor which includes a pair of frame members one of which carries an excavating mechanism and the other of which has a ground engaging portion to support the weight of the excavated load, together with three independent hydraulic hoists for operating the various portions of the device, and hydraulic fluid flow control means for operating each of the hydraulic hoists.

Other and further objects may become apparent from the following description and claims, and the drawings illustrating one form of my invention in which:

Fig. 1 is a side elevation of my invention shown in combination with a conventional farm tractor;

Fig. 2 is a plan view of the device shown in Fig. 1;

Fig. 2a is a fragmentary detail of a portion of the device shown in Fig. 2;

Fig. 3 is a sectional detail and plan elevation of a portion of the device taken on the lines 3—3 of Fig. 1;

Fig. 4 is a sectional end view taken on the lines 4—4 of Fig. 1;

Fig. 5 is a sectional end view taken on the lines 5—5 of Fig. 1;

Fig. 6 is an enlarged plan view of the valve mechanism shown in Fig. 1;

Fig. 7 is a cross-sectional view taken on the lines 7—7 of Fig. 8;

Fig. 8 is a section taken on the lines 8—8 of Fig. 7;

Figs. 9–14 are cross-sectional views taken along lines of the respective figures of Fig. 8.

Figure 10:
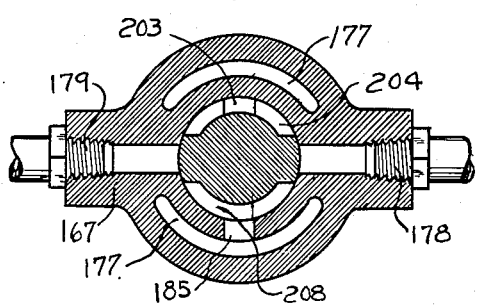
Figure 11:
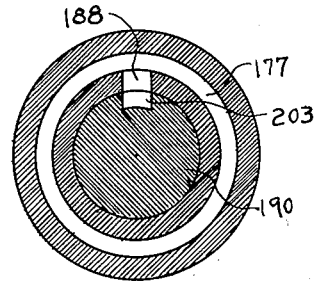
Figure 12:
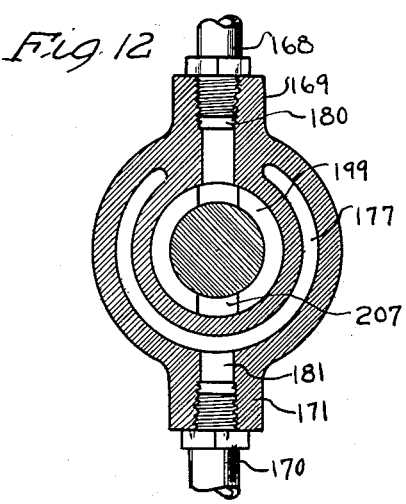
Figure 13:
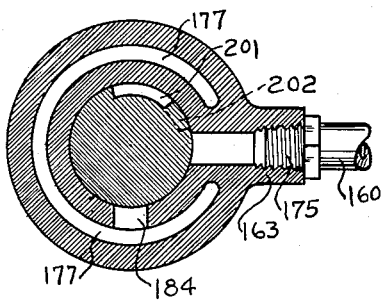
Figure 14:
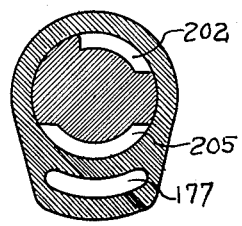

Referring to the several views of the drawing, the invention will now be explained in detail. Referring first to Figs. 1 and 2, general reference numeral 16 indicates a conventional farm tractor of the tricycle gear type having a body portion 17, front wheels 18 and a pair of rear wheels 19, 20 which are connected by a rear axle frame 21.

Supported on the tractor body 17 and operated by a portion of the tractor in a conventional manner, not shown, is a hydraulic pump 22 connected to a reservoir 24 and a control valve mechanism indicated by the general reference numeral 26, which will be described hereinafter in detail in connection with Figs. 6–15.

Indicated by the general reference numeral 30 is an excavating device, which in combination with the tractor and the hydraulic fluid system mentioned above forms the present invention. A frame 31 composed of a pair of heavy tubular members 32, 34 each have one end connected by pins 36, 38 to a pair of brackets 40, 42 to the rear axle frame 21 of the tractor 16. At their outer or front ends the members 32, 34, as shown in Figs. 1 and 3, are secured to a ground-engaging member indicated by the general reference numeral 44. Member 44 consists of a flat plate member 46 having up-turned edges and supporting a pair of channel beams 48, 50. Two pairs of supporting plates 52, 54, Figs. 3 and 4, extend between the channel beams 48 and 50, and by means of bolts 56, 58 form pivotal supports for the lower ends of a pair of cylinders 60, 62. The plate 46 is pivoted on bolts 56, 58 to extensions of arms 32, 34 so that the plate can adjust itself to the ground level.

The members 32, 34 are joined adjacent their outer ends by a brace structure 35. Each of the arms 32, 34 have on their upper surface a tie rod 64, 66 extending over upstanding connecting members 68, 70, which, as shown in Fig. 5, are connected to a pair of rods 72, 74 to a cross frame 76 having a tie rod 77 on its upper surface. The cross frame 76 is connected to a piston rod 78 having a piston, not shown, within a cylinder 80. Cylinder 80 is supported on a bracket 79 secured to the front end of tractor body 17.

Referring again to Figs. 1 and 2, a second frame 75 composed of arms 82, 84 are joined by pivot pins 81, 83 to brackets 40, 42 on the rear axle frame 21. A pair of brace rods 86a, 86b are positioned on the upper surface of arms 82, 84 and extend over tubular upright supports 85, 87 and at their forward ends are joined to angularly shaped brackets 88, 89. Between the brackets 88, 89 a heavy connecting member 90 extends and forms a support for an excavating mechanism indicated by general reference numeral 91.

The excavating mechanism 91 includes a main or central tine 92 with auxiliary tines 93, 94 on either side thereof. The central tine 92 has a quadrant-shaped portion 95 on its rear end, and member 95 carries on either side a heavy bracket 96 which engages the rear or tail ends 93a and 94a of the auxiliary tines 93, 94.

The outer end of the main tine 92, as shown in Fig. 2a, is provided with a removable point 97 which is secured to the body of the tine by means of a pin 98. This is for replacing the point 97 if damaged.

Referring now to Figs. 1, 2 and 4, will be described the manner and means in which the frame 75 composed of the arms 82 and 84 is elevated. The two cylinders 60, 62 mounted on member 44 are provided with piston rods 99, 100, and on their upper ends carry rotatable pulleys 102, 104. A pair of cables 106, 108, are each anchored on one of their ends to members 110, 112, Figs. 3 and 4, and extend over the top of pulleys 102, 104, and at their other ends are joined to the upright supports 85, 87 over which the tie rods 86a, 86b extend.

The quadrant member 95, Fig. 1, which is a part of the rear end of the main tine 92 has secured at 114 on its front surface a cable 116 which extends under a pulley 118 supported on a cross member 120 between members 82, 84. Cable 116 extends over a pulley 122 mounted on the upper end of a piston rod 124 which is connected to a piston, not shown, and movable within a cylinder 126 that is supported on a beam 128 extending between the members 82, 84 in rear of the cross member 120. The other end of cable 116 is secured at 130 to the rear of beam 128. This arrangement of the cable provides for the movement of the center tine 92 in one direction. A compression spring 132, Fig. 2, within a tubular telescopic casing 134 extends between the cross member 120 and a pivotal connecting member, not shown, under bracket 96 to bias the main tine 92 in an opposite direction from that which it is moved by cable 116.

The auxiliary tines 93, 94 at their rear ends 93a, 94a are connected to cables 136, 138, and through the aid of suitable pulley means, the cables extend along the top of member 84 to the rear of the tractor where they are connected to a manually operable lever 140.

Referring now to Figs. 6–14, and particularly Fig. 6, the details of valve mechanism indicated by the general reference numeral 26 will be explained. Valve 26 consists of casing portions 150, 152 which are provided with flanges 151, 153 that are bolted together by a plurality of bolts 154 to form a unitary casing. Casing portion 152 has at one end a plate 155, which, as shown in Fig. 7, is secured to portion 152 by a plurality of screws 156. Casing portion 152 is also provided with an H-shaped slot 157 through which extends a manual operator 158.

Referring next to Figs. 6 and 7 are shown three conduits 160, 161 and 162 which are joined to bosses 163, 164, 165 protruding from one side of the valve body. On the other side of the valve body, as shown in Fig. 6, a conduit 166 is connected to a boss 167. As shown in Figs. 6 and 8, a conduit 168 is connected to a boss 169 and a conduit 170 is connected to a boss 171. The several conduits are connected to the several cylinders previously mentioned.

Referring now to Figs. 7 and 8 are shown the internal passages of valve member 26. Within the interior of body portion 152 and extending from body portion 150 is a tubular member 172 which is closed by a threaded cap 173. Within its interior tubular portion 172 has formed a central or main chamber 174. Referring now to Fig. 7, an opening 175 extends through boss 163 into the central chamber 174. An opening 176 extends through boss 164 into a passage 177. An opening 178 extends through boss 165 and forms communication with the central chamber 174. An opening 179 extends through boss 167 and also forms communication with 174.

The passage 177 is a cylindrical internal passage within body portion 150 and extends continuously within the interior of the body portion being separated from chamber 174 by a wall 182. Because this passage extends around certain of the bosses and its fragmentary portions appear differently in the several views of the drawing, the various portions will be identified as alphabetical integers of the reference numeral 177.

Referring now to Fig. 8, an opening 180 extends through boss 169 and communicates with the central chamber 174. An opening 181 extends through boss 171 and joins an elongated portion 177a of passage 177. Extending outwardly from passage 177a are passages 183, 184, 185, 186, all communicating with the central chamber 174. On either side of boss 169 within the interior portion of the structure are passages 177b and 177c which through passages 187, 188 communicate with the central chamber 174.

Openings or passages 175, 178, 179, 187 and 188 are slightly oval or elongated, see Fig. 8, to increase fluid flow therethrough.

Within the interior of the central chamber 174 is a movable valve actuator indicated by the general reference numeral 190 having a portion 192 extending through the cap 173 and by means of a bifurcation 193, shown in Fig. 7, receives the manual actuator 158 which is pivotally connected to opposite sides of bifurcation 193 by a pin 194. At its lower end the manual actuator, as shown in Figs. 8 and 9, is mounted within a socket 159 in casing 152. A packing retainer 195 and a layer of packing material 196 surround the portion 192 of member 190 to form a fluid seal. Member 190 is both axially and longitudinally movable within the central chamber 174 to control the flow of fluid with respect to the numerous passages within the valve body. To properly control the flow of fluid through these numerous openings and passages member 190 is provided with a multiplicity of grooves and recesses which will now be described. On either side of a central ring 197 are annular grooves 198, 199. A longitudinal groove 200 joins annular groove 198 with a recess 201 that is in free communication with an adjacent recess 202 which is longer than recess 201. On the other side of the central ring 197 a longitudinal groove 203 joins the annular groove 199 with a recess 204.

On the opposite side of member 190 from that shown in Fig. 7 are another plurality of recesses. In Fig. 8, the member 190 is shown at an angle of 90° from that of Fig. 7, and, therefore, the additional recesses in member 190 are shown in profile. Beginning on the left of the figure, a recess 205 is substantially opposite recess 202, see Fig. 14. A recess 206, Fig. 8, extends laterally from the annular groove 198. A recess 207 also extends laterally from the annular groove 199. The recesses 206, 207 are provided to counter-balance fluid pressure on the opposite side of member 190. At the right side of member 190, a recess 208, see Fig. 10, is substantially diametrically opposite recess 204.

In Fig. 8 certain of the recesses within member 190 extend arcuately about the outer surface of member 190 and their extensions are shown in dotted lines. For purposes of clarity, certain of the passages and recesses, not clearly evident in Figs. 7 and 8, are further shown in detail in Figs. 9–14.

Figure 15:
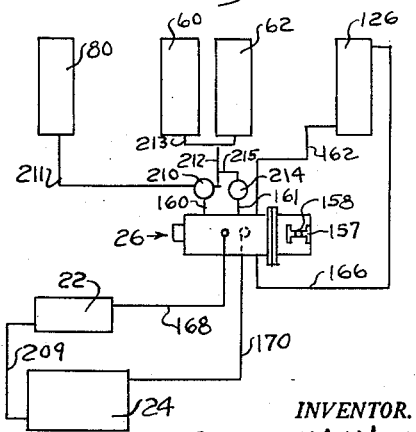
Fig. 15 is a schematic diagram of the fluid circuit used in operating different portions of the device.

Referring now to Fig. 15, the entire fluid circuit is shown. Pump 22 has its inlet connected by conduit 209 with the lower portion of reservoir 24 and its outlet connected to valve 26 by conduit 168. Fluid returning from valve 26 passes through conduit 170 into the top of reservoir 24.

The fluid circuit with respect to the several cylinders will now be explained. A three-way valve 210 is joined to the end of conduit 160. From one side of valve 210 a conduit 211 extends to cylinder 80. A second conduit 212 extends from the other side of valve 210 to a header 213 which extends into the twin cylinders 60, 62. Conduit 161 is joined to a by-pass valve 214 that joins a short conduit 215 that extends to conduit 212. Conduit 162 extends uninterruptedly to the lower portion of cylinder 126 and enters said cylinder at a point below a piston head, not shown, within the interior of said cylinder. Conduit 166 extends uninterruptedly to the upper part of cylinder 126 and joins the cylinder 126 at a point above the upper limit of movement of the piston head connected to piston rod 124.

Before describing the operation of the structure as a whole, it is felt that a more comprehensive understanding could be had by explaining the fluid circuit to the several fluid motors here referred to as hydraulic cylinders. Commencing with cylinder 80, which is connected to valve 26 by conduit 211, three-way valve 210 and conduit 160. Oil or other hydraulic fluid contained in reservoir 24 would be drawn by pump 22 through the conduit 209 and delivered from the high pressure side of pump 22 through conduit 168 into opening 180. With the actuator 158 in a neutral position in the center of the H-shaped slot 157, the oil will pass on either side of ring 197 into the annular grooves 198, 199 and thence through passages 187, 188 to passage 177 where it will pass exteriorly around member 190, leaving by opening 181 and conduit 170 to the reservoir and performs no useful work. To lower the piston in cylinder 80, it is necessary to drain fluid out of the cylinder, and this is accomplished by rotating valve 210 to provide fluid communication between conduit 211 and conduit 160, and by moving the actuator 158 to the lower right hand leg of slot 157. When this is done, member 190 moves to the right within the chamber 174 and the ring 197 is moved on the right side of opening 180. Oil entering opening 180 passes through the annular passage 198, passage 187, passage 177b, into the general passage 177, and leaves the valve body 26 through opening 181 without having performed any useful work. The liquid in cylinder 80 at the same time is enabled to be drained therefrom by entering conduit 211, valve 210, conduit 160, passage 175, recess 205, passage 184, passage 177, opening 181 into conduit 170. When the cylinder is emptied or the piston has been lowered to the desired extent, the actuator 158 is moved to a neutral position.

To raise the piston within cylinder 80, the valve 210 is turned to the position previously mentioned and the actuator 158 is moved to the upper right hand leg of the slot 157. By this change of position, oil entering opening 180 passes into the annular passage 198 and through recess 206 into recess 202 where it leaves member 190 through the opening 175, conduit 160, valve 210 and conduit 211 to the cylinder. When the cylinder has been raised for a sufficient distance the actuator is again moved to a neutral position and valve 210 is closed.

To lower the pistons within the twin cylinders 60, 62, valve 210 is rotated to form communication between conduit 160 and conduit 212. The manual actuator 158 is moved to the lower right hand leg of slot 157 and the fluid within the two cylinders 60, 62 drains through the header 213, conduit 212, conduit 160 and through valve 26 in the manner previously described for discharging cylinder 80.

To raise the pistons within cylinders 60, 62, the procedure is identically the same as that previously described for raising the piston within cylinder 80, except, of course, that valve 210 must have been rotated to form communication between conduit 212 and conduit 160 to the exclusion of conduit 211.

To lower the piston within cylinder 126, which it should be noted is a double acting cylinder, the manual actuator 158 is moved to the lower left hand leg of slot 157. When this is done, two things take place. Oil is drained out of the bottom of cylinder 126 and at the same time oil is pumped into the top of the cylinder. The fluid circuit may be traced as follows: Oil leaving cylinder 126 passes through conduit 162 and enters the valve body 26 through the opening 178. It then passes into the recess 208 and then outwardly from the center chamber 174 through the opening 185 into passage 177 and through opening 181 into conduit 170 to the reservoir 24. At the same time oil entering conduit 168 and passing through opening 180 enters the annular groove 199, thence passing through the longitudinal slot 203, recess 204, opening 179 and conduit 166 to the upper portion of cylinder 126.

To raise the piston within cylinder 126, a reverse circuit is used, which is accomplished by moving the actuator 158 to the upper left hand leg of slot 157. This permits oil in the upper portion of cylinder 126 to pass through conduit 166 into opening 179 entering recess 208 and leaving the same through passage 185 into passage 177 and thence through the opening 181 to conduit 170. At the same time oil entering the valve through conduit 168 passes through opening 180 into the annular recess 199 and across slot 203 into recess 204 and thence through opening 178 and conduit 162 into the lower portion of cylinder 126.

Under certain conditions it may be necessary to raise the piston in cylinder 126 and simultaneously discharge the liquid within the twin cylinders 60, 62 to lower the pistons therein. This operation may be simultaneously accomplished by moving the manual actuator 158 into the upper left hand leg of slot 157. At the same time the by-pass valve 214 between conduit 161 and nipple 215 is opened. This permits liquid in the cylinders 60, 62 to pass through the header 213 into conduit 212 and thence to nipple 215, valve 214 and conduit 161 through opening 176, into the cylindrical passage 177 whence it passes outwardly through the opening 181 to conduit 170. In the preceding discussion relative to the raising of the piston within cylinder 126 the circuit for accomplishing this was fully disclosed and would be the same in this example.

It should be mentioned that the function of passages 183 and 186 are merely drains from the central chamber 174 and provide escape for a liquid seepage along the outer surface of member 193. It should be further understood that member 190 and the center chamber 174 will each be carefully machined to minimize leakage.

The general operation of the device will now be described, it being understood that the various cylinders will, without repetition, be operated in the manner previously described. When it is desired to uproot a stump or to lift a heavy rock which is embedded in the soil, the tractor carrying the excavating mechanism described by general reference numeral 30 is moved into the vicinity of the object with all parts of mechanism 30 elevated from the ground. The ground engaging portion 44 is lowered to a point where it approaches the ground but need not necessarily contact the same. The first operation in uprooting the object is to lower the center tine 92 until it contacts the ground at one side of the object. Then the tractor is propelled with the center tine digging into the ground. In order to most effectively use the center tine 92, it may be necessary while raising the piston rod within cylinder 126, to simultaneously lower the frame structure 31 composed of the members 32, 34, and this may be accomplished as previously mentioned, by discharging the cylinders 60, 62 at the same time that oil is being charged into the lower portion of cylinder 126. During this phase of the operation, the auxiliary tines 93, 94 are maintained in a raised position by means of cables 136, 138 and the lever 140. Thereafter when the object has been dislodged, the center tine 92 is raised and by moving the lever 140 to a forward position, the auxiliary tines 93, 94 are rotated until their rear ends 93a, 94a engage the bracket 96 so that tines 92, 93 and 94 are now substantially parallel to each other. Then by again manipulating cylinder 126, the three tines will operate in unison to pick up the load. When the tractor has been manipulated to drive the excavating portion 91 under the object, the twin cylinders 60, 62 are charged to raise the frame mechanism 75 composed of the arms 82, 84 to an elevated position so that a truck or wagon may be moved under the excavating portion 91 to receive the object which may be dumped by again actuating cylinder 126.

It should be under stood that although the tine 92 is moved in one direction by cylinder 126, it is given an impetus to move in the other direction by compression spring 132 within the tubular telescopic casing 134.

The mechanism is relatively simple to operate directly from the seat of a tractor and is capable of performing the several operations needed to dislodge and excavate a heavy object by the simple manipulation of the main control valve 26 together with its auxiliary valves and the lever 140.

The advantage of my invention resides in providing a sturdy, rugged device adapted for connection to a conventional farm tractor for excavating and hoisting heavy objects with a minimum of human effort and at a relatively low cost to thus increase the value of land which has heretofore been unsuitable for cultivation.

My invention is not restricted to the single illustration, but is defined in the terms of the appended claims.

I claim:

1. Means for excavating a heavy object from the surface of land, including in combination, a tractor, a main frame supported at one end on the tractor and extending forwardly of the tractor, a ground engaging portion secured to the front end of said main frame, a first power hoist mounted on the front end of the tractor and connected to the main frame for vertically moving the ground engaging portion, a second frame member supported at one end on the tractor and extending beyond the outer limits of the main frame, a plurality of excavating tines pivotally mounted on the front end of the second frame member, a second power hoist connected to one of said tines, manually operable means connected to the remainder of said tines for moving the same independent of said first named tine, means carried by said first named tine for abutting the remainder of said tines for simultaneously moving all of said tines, a third power hoist supported on the ground engaging portion of the main frame member and connected to the second frame member for vertically moving the outer end thereof with respect to the ground, power means operated by the tractor for actuating the several hoists, and a power control device operable to simultaneously actuate two of said hoists.

2. An excavating device, comprising a frame member, a plurality of pivotally movable tines mounted on one end of the frame member, manually operable means connected to one of said tines for pivotally moving the same independently of a second of said tines, a fluid motor connected to a second of said tines for pivotally moving the latter, and an abutment carried by the second of said tines for engaging a portion of the first named tine when the same is in a predetermined position whereby the first named tine when the latter is pivotally moved by the fluid motor moves in unison with the second named tine.

3. An excavating device, comprising a pair of members forming a first frame, a second pair of members forming a second frame, means carried by one end of each of said members for connecting said first and second frames to a tractor and in such a manner that the frames extend in front of the tractor, a pair of fluid motors mounted on the first frame and operatively connected to the second frame for elevating the second frame relative to the first frame, a plurality of movable tines pivotally connected in spaced side-by-side relation to the forward end of the second frame, the central one of said tines formed with a quadrant shaped rear end and a pointed front end, a fluid motor mounted on the second frame and operatively connected to a forward part of the quadrant shaped portion of said central tine for rotating the same relative to said second frame, means for rotating the remainder of said tines independently of said first named tine, and abutments carried by said central tine and extending transversely across the remainder of said tines when the latter are in a predetermined position for simultaneously moving all of said tines.

4. An excavating device for removing heavy objects from the ground, comprising a frame member adapted to be connected at one end to lateral portions of a tractor and to extend in front of the tractor, a plurality of tines pivotally mounted on the forward end of the frame, one of said tines formed with a quadrant shaped rear end and a pointed front end, a fluid motor mounted on the frame and operatively connected to the forward part of the quadrant shaped portion of said tine for rotating the same relative to the frame, resilient means carried by the frame and connected to the tine for biasing the same in a direction opposite that to which the same is moved by the motor, means connected to another of said tines for moving the same independently of the first named tine, and an abutment carried by the first named tine and projecting across a portion of the second named tine for engaging the latter when the same is in a predetermined position, whereby both of said tines are simultaneously moved by the fluid motor.

5. A tractor operated excavating device, embodying a tractor, a first generally U-shaped frame surrounding the tractor with its closed end extending in front of the tractor and its other ends pivotally connected to the tractor, a second generally U-shaped frame surrounding the tractor and overlying the first frame with the arms of its open end pivotally connected to the tractor adjacent the pivotal connections of the first frame and with its closed end extending in front of the tractor beyond the forward limits of the first frame, at least three independent tines pivotally mounted between their opposite ends in side-by-side relationship on the front end of the second frame, first motor means operatively connected to the center one of said tines and being effective to move said tine on its pivot through a substantial arc to excavate an object from the ground, an abutment carried by said center tine and extending across the remaining tines when the latter are in a predetermined position with respect to the center tine, whereby all of said tines are simultaneously moved in one direction by said first motor means to elevate the dislodged object, second motor means carried by said first frame and connected to said second frame for moving the second frame relative to the first frame, and power means carried by the tractor and operatively connected to said first and second motor means for actuating said motor means.

References Cited in the file of this patent

UNITED STATES PATENTS

| Number | Name | Date |
| --- | --- | --- |
| 37,894 | Bell et al. | Mar. 17, 1863 |
| 1,829,728 | Beatty et al. | Nov. 3, 1931 |
| 2,008,324 | Grab | July 16, 1935 |
| 2,187,707 | Kane | Jan. 16, 1940 |
| 2,191,048 | Tims | Feb. 20, 1940 |
| 2,302,801 | Powelson | Nov. 24, 1942 |
| 2,358,298 | Benjamin | Sept. 19, 1944 |
| 2,418,251 | Drott | April 1, 1947 |
| 2,450,481 | May | Oct. 5, 1948 |
| 2,451,101 | Leschinsky | Oct. 12, 1948 |
| 2,471,289 | Sedgwick | May 24, 1949 |
| 2,535,099 | Slick | Dec. 26, 1950 |
| 2,628,734 | Jannsen | Feb. 17, 1953 |